Dec. 13, 1932.  L. S. VAN KLEECK  1,890,872
ANTISKID DEVICE
Filed Dec. 30, 1931  2 Sheets-Sheet 1

Inventor
Leland S. Van Kleeck
By Geo. P. Kimmel
Attorney

Dec. 13, 1932.   L. S. VAN KLEECK   1,890,872
ANTISKID DEVICE
Filed Dec. 30, 1931   2 Sheets-Sheet 2
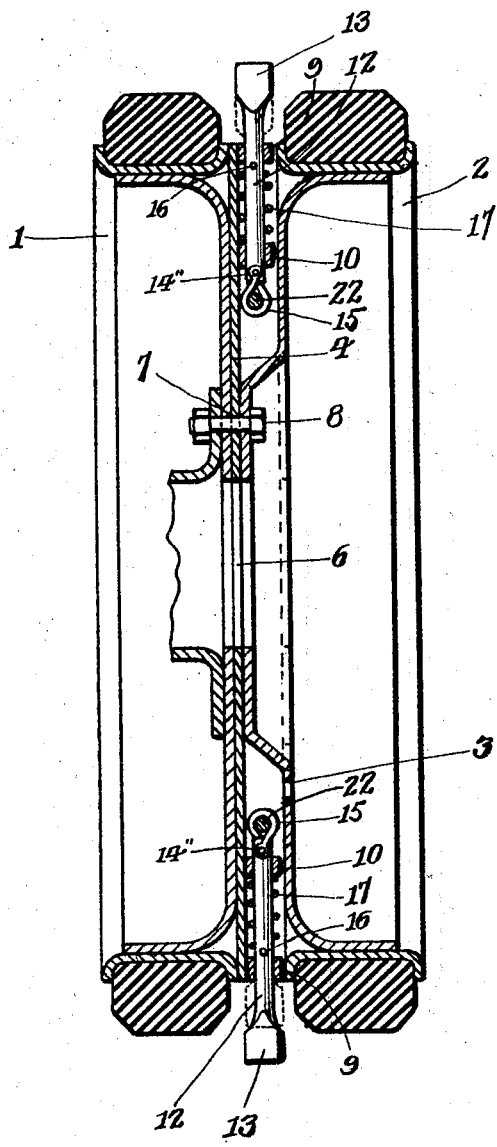
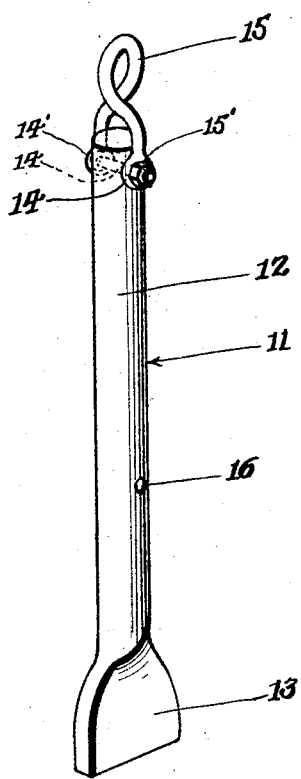
Inventor
Leland S. Van Kleeck
By Geo. P. Kimmel
Attorney Patented Dec. 13, 1932

1,890,872

UNITED STATES PATENT OFFICE

LELAND S. VAN KLEECK, OF MONTGOMERY, NEW YORK

ANTISKID DEVICE

Application filed December 30, 1931. Serial No. 584,003.

My invention relates to an anti-skid device designed primarily for use in connection with duplex truck wheels, but it is to be understood that an anti-skid device, in accordance with my invention may be employed in any connection for which it is found applicable, and the object thereof is to provide, in a manner as hereinafter set forth, a device of the class referred to for permanent attachment to the wheels and including a set of normally retracted inactive anti-skid members having their outer ends positioned inwardly of the treads of the wheels and capable when extended to project beyond such treads to prevent skidding and to create traction for the wheels.

A further object of my invention is to provide, in a manner as hereinafter set forth, a device of the class referred to including a spring controlled, extendible, sectional carrier having attached thereto a plurality of anti-skid elements for normally maintaining the latter in retracted position and means coacting with the sections of the carrier for latching the carrier and anti-skid elements extended to provide for the latter to assume a position to prevent skidding and to provide for traction to the wheels to which the device is attached.

Further objects of my invention are to provide, in a manner as hereinafter set forth, an anti-skid device for the purpose referred to which is comparatively simple in its construction and arrangement, strong, durable, compact, readily installed, thoroughly efficient in its use, conveniently latched in its active position, and comparatively inexpensive to manufacture.

To the above ends essentially and others which may hereinafter appear, my invention consists of such parts and combination of parts which fall within the scope of the invention as claimed.

In the drawings:

Figure 2 is a section on line 2—2 Figure 1 of the anti-skid device and further showing in section a pair of disc wheels between which the device is arranged.

Figure 3 is a perspective of an anti-skid element.

Figure 1:
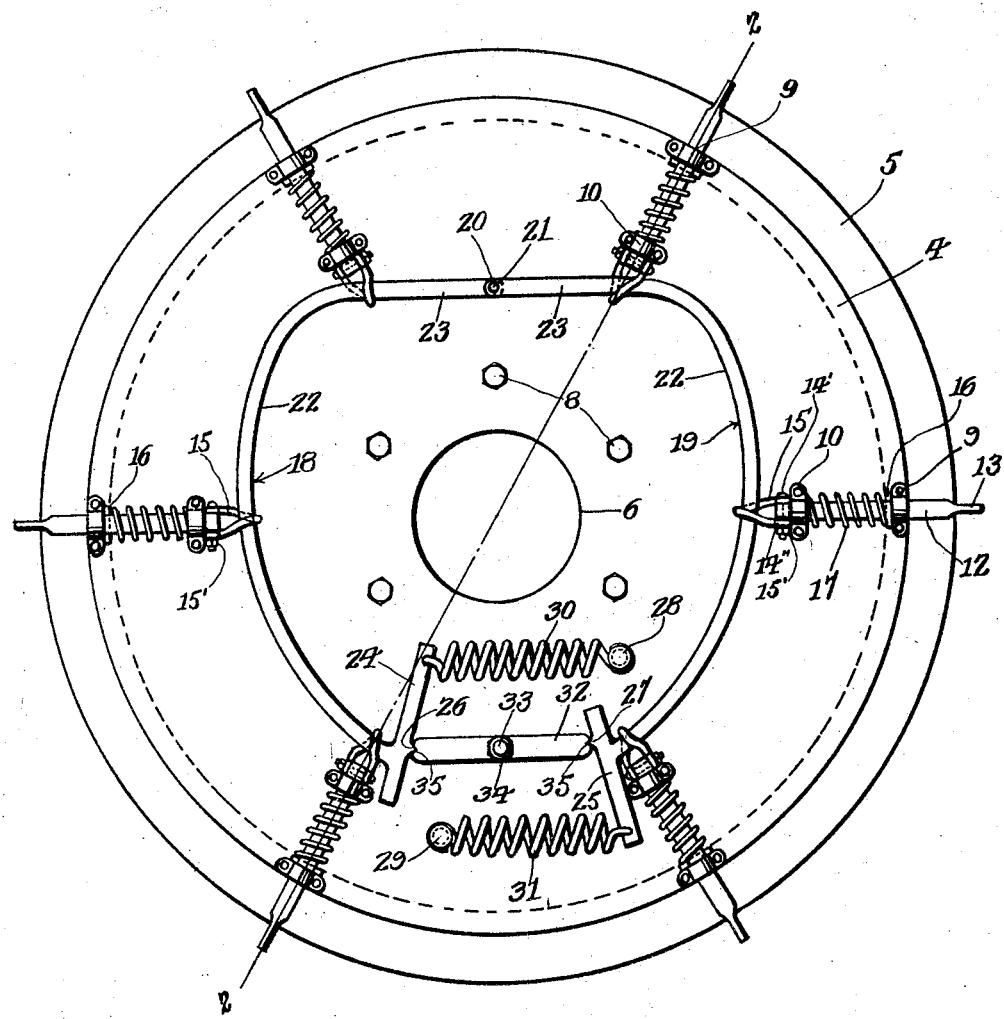
Figure 1 is an elevation of an anti-skid device in accordance with my invention as installed against the inner side of one wheel of the pair of truck wheels.

The drawings illustrate in dotted lines a pair of oppositely disposed truck wheels 1, 2 between which the device is arranged and with the latter anchored against the inner side of wheel 1. The wheel 2 has an opening 3 therein for a purpose to be presently referred to. The wheels 1, 2 and the anti-skid device bodily move together.

The anti-skid device includes a disc 4 of less diameter than the tire 5 of each wheel and which is arranged concentrically relative to the inner sides of the wheels 1, 2. The disc 4 has an axial opening 6 which registers with the hubs of the wheels and a circular row of openings 7 for the passage of holdfast means 8 for the purpose of anchoring the device to wheel 1.

Secured to that face of disc 4 which opposes the inner side of wheel 2 are radially disposed pairs of spaced combined guide and keeper elements. The elements of each pair are indicated at 9, 10, are arranged in alignment and with the element 9, which is the outer element of the pair flush with the edge of disc 4. Slidably extending through each pair of combined guide and keeper elements is an anti-skid member 11 consisting of a stem 12 of circular cross section terminating at its outer end in a gripper 13 which is flat, disposed in alignment with the longitudinal axis of and of greater width than the diameter of stem 12. The inner end of stem 12 is formed with an opening 14 for the passage of a headed bolt 14' the latter extending through the apertured ends 14" of a torsionally twisted coupling link 15 for detachably connecting the latter to member 11. A retaining nut 15' is carried by bolt 14'. The stem 12 between its transverse median and outer end has secured thereto and diametrically thereof a pin 16 of a length to extend laterally in opposite directions from the stem. Mounted on the stem 12 between pin 16 and element 10 is a coiled controlling spring 17 which functions to project and to form a cushion for the anti-skid member 11.

The device includes a spring controlled carrier formed of a pair of oppositely disposed sections 18, 19 having the opposed ends 20 thereof pivotally mounted on a pin 21 fixed to disc 4 at a point between the opening 6 and the outer edge of such disc. Each of said sections includes a bow-shaped vertically disposed part 22 terminating at one end into a horizontally disposed end part 23 extending inwardly substantially at right angles to the parts 22. The part 23 has its free end mounted on pin 21. The other end of part 22 of section 18 merges into an inwardly inclined arm 24 at a point between the transverse median and outer end of the latter. The other end of section 19 merges into an inwardly inclined arm 25 at a point between the transverse median and inner end of the latter. The arms 24, 25 oppose each other, are disposed at opposite inclinations and have the opposed side edges formed with tapered lugs 26, 27 respectively, the former located adjacent the outer end of arm 24 and the latter being adjacent the inner end of arm 25. Secured to disc 4 and located adjacent each side of the diametric center of the latter is a headed anchoring post. The posts are designated 28, 29 and the former is arranged within and the latter exteriorly of the carrier. Anchored at one end to the post 28, the latter being arranged adjacent the inner end of arm 25, is one end of a coiled controlling spring 30 for section 18. The other end of spring 30 is attached to the inner end of arm 24. Anchored at one end to the post 29, the latter being located outwardly of and adjacent the outer end of arm 24 is one end of a coiled controlling spring 31 for section 19. The other end of spring 31 is attached to the outer end of arm 25. The arms 24, 25 are eccentrically disposed with respect to those ends of the parts 18, 19 respectively with which they are integral.

Carried by the disc 4 between the arms 24, 25 is a rotatable locking member 32 for releasably maintaining the sections 18, 19 in an extended position against the action of the springs 30, 31. The member 32 is mounted on a pivot 33 and carries a wrench engaging portion 34. Each end of member 32 is formed with a recess 35, one receiving lug 26 and the other lug 27. When the recesses 35 of the member 32 receive the lugs 26, 27 the arms 24, 25 are locked to said member for the purpose of maintaining the carrier in the position shown in Figure 1 whereby the anti-skid members are held in an extended position. The member 32 is shifted to and from the position shown in Figure 1, by a wrench or other tool, not shown, which is extended through opening 3 to engage portion 34 of member 32. The coupling links 15 of the anti-skid members 11 are shiftably mounted on the sections 18, 19 of the carrier. The strength of either spring 30, 31 is greater than the combined strength of the springs 17. The springs 30, 31 function to retract the sections 18, 19 of the carrier to move the elements 11 to inactive position when the locking member is shifted from its engagement with the lugs 26, 27.

What I claim is:—

1. An anti-skid device comprising a disc adapted to be secured to one side of a wheel, a carrier formed of a pair of oppositely disposed sections, one end of one section opposing one end of the other section, each of said sections including a bow-shaped vertical part merging at one end into a horizontal part extending inwardly substantially at right angles to said other part, means for pivotally supporting the inner ends of said horizontal parts, each of said bow-shaped parts merging at its other end into and eccentrically of an inclined arm, said arms disposed at opposite inclinations, a controlling spring anchored at one end to said disc and at its other end to the inner end of one of said arms, a controlling spring anchored at one end to said disc and at its other end to the outer end of the other of said arms, normally retracted, cushioned anti-skid members shiftably connected to said sections and slidably attached to said disc, and shiftable means coacting with said arms for extending the carrier to shift said members to and for maintaining them in active position against the action of said controlling springs.

2. In an anti-skid device, an extendible carrier including a pair of oppositely disposed sections pivotally mounted at one end on a supporting member and each having its other end provided with an extended inclined arm, said arms being spaced relatively to each other and disposed at opposite inclinations, a plurality of spaced, cushioned, extendible and retractable anti-skid members shiftably attached at their inner ends to said sections and bodily movable with the latter, supporting means for the carrier and said anti-skid members, a controlling spring attached to said means and the inner end of one of said arms, a controlling spring attached to said means and to the outer end of the other of said arms, and shiftable means attached to said supporting means, arranged between said arms and coacting with the latter for extending the carrier to shift said members to and for maintaining them in active position against the action of said controlling springs.

3. An anti-skid device comprising a disc adapted to be secured to one side of a wheel, a carrier formed of a pair of oppositely disposed sections, one end of one section opposing one end of the other section, each of said sections including a bow-shaped vertical part merging at one end into a horizontal part extending inwardly substantially at right angles to said other part, means for pivotally supporting the inner ends of said horizontal parts, each of said bow-shaped parts merging at its other end into and eccentrically of an inclined arm, said arms disposed at opposite inclinations, a controlling spring anchored at one end to said disc and at its other end to the inner end of one of said arms, a controlling spring anchored at one end to said disc and at its other end to the outer end of the other of said arms, normally retracted, cushioned anti-skid members shiftably connected to said sections and slidably attached to said disc, shiftable means coacting with said arms for extending the carrier to shift said members to and for maintaining them in active position against the action of said controlling springs, each arm being eccentrically disposed with respect to that end of the section from which it extends, and said arms being oppositely disposed with respect to each other.

4. An anti-skid device comprising a disc adapted to be secured to one side of a wheel, a carrier formed of a pair of oppositely disposed sections, one end of one section opposing one end of the other section, each of said sections including a bow-shaped vertical part merging at one end into a horizontal part extending inwardly substantially at right angles to said other part, means for pivotally supporting the inner ends of said horizontal parts, each of said bow-shaped parts merging at its other end into and eccentrically of an inclined arm, said arms disposed at opposite inclinations, a controlling spring anchored at one end to said disc and at its other end to the inner end of one of said arms, a controlling spring anchored at one end to said disc and at its other end to the outer end of the other of said arms, normally retracted, cushioned anti-skid members shiftably connected to said sections and slidably attached to said disc, shiftable means coacting with said arms for extending the carrier to shift said members to and for maintaining them in active position against the action of said controlling springs, said shiftable means having recesses in the ends thereof, and said arms formed with lugs for extension into said recesses for holding said shiftable means in position to extend the carrier.

5. In an anti-skid device, an extendible carrier including a pair of oppositely disposed sections pivotally mounted at one end on a supporting member and each having its other end provided with an extended inclined arm, said arms being spaced relatively to each other and disposed at opposite inclinations, a plurality of spaced, cushioned, extendible and retractable anti-skid members shiftably attached at their inner ends to said sections and bodily movable with the latter, supporting means for the carrier and said anti-skid members, a controlling spring attached to said means and the inner end of one of said arms, a controlling spring attached to said means and to the outer end of the other of said arms, shiftable means attached to said supporting means, arranged between said arms and coacting with the latter for extending the carrier to shift said members to and for maintaining them in active position against the action of said controlling springs, said shiftable means having recesses in the ends thereof, and said arms formed with lugs for extension into said recesses for holding said shiftable means in position to extend the carrier.

6. An anti-skid device comprising a disc adapted to be secured to one side of a wheel, a carrier formed of a pair of oppositely disposed sections, one end of one section opposing one end of the other section, each of said sections including a bow-shaped vertical part merging at one end into a horizontal part extending inwardly substantially at right angles to said other part, means for pivotally supporting the inner ends of said horizontal parts, each of said bow-shaped parts merging at its other end into and eccentrically of an inclined arm, said arms disposed at opposite inclinations, a controlling spring anchored at one end to said disc and at its other end to the inner end of one of said arms, a controlling spring anchored at one end to said disc and at its other end to the outer end of the other of said arms, normally retracted, cushioned anti-skid members shiftably connected to said sections and slidably attached to said disc, shiftable means coacting with said arms for extending the carrier to shift said members to and for maintaining them in active position against the action of said controlling springs, each arm being eccentrically disposed with respect to that end of the section from which it extends, said arms being oppositely disposed with respect to each other, said shiftable means having recesses in the ends thereof, and said arms formed with lugs for extension into said recesses for holding said shiftable means in position to extend the carrier.

In testimony whereof, I affix my signature hereto.

LELAND S. VAN KLEECK.